United States Patent Office 3,031,219
Patented Apr. 24, 1962

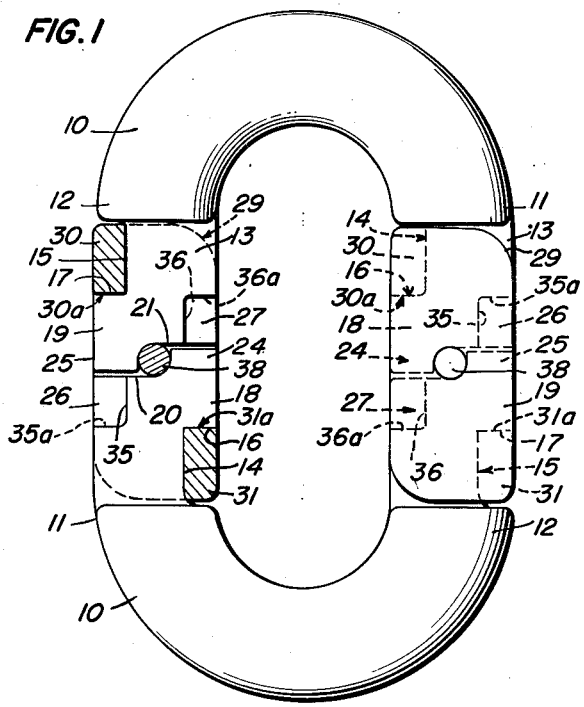
INVENTOR
William K. Robbins

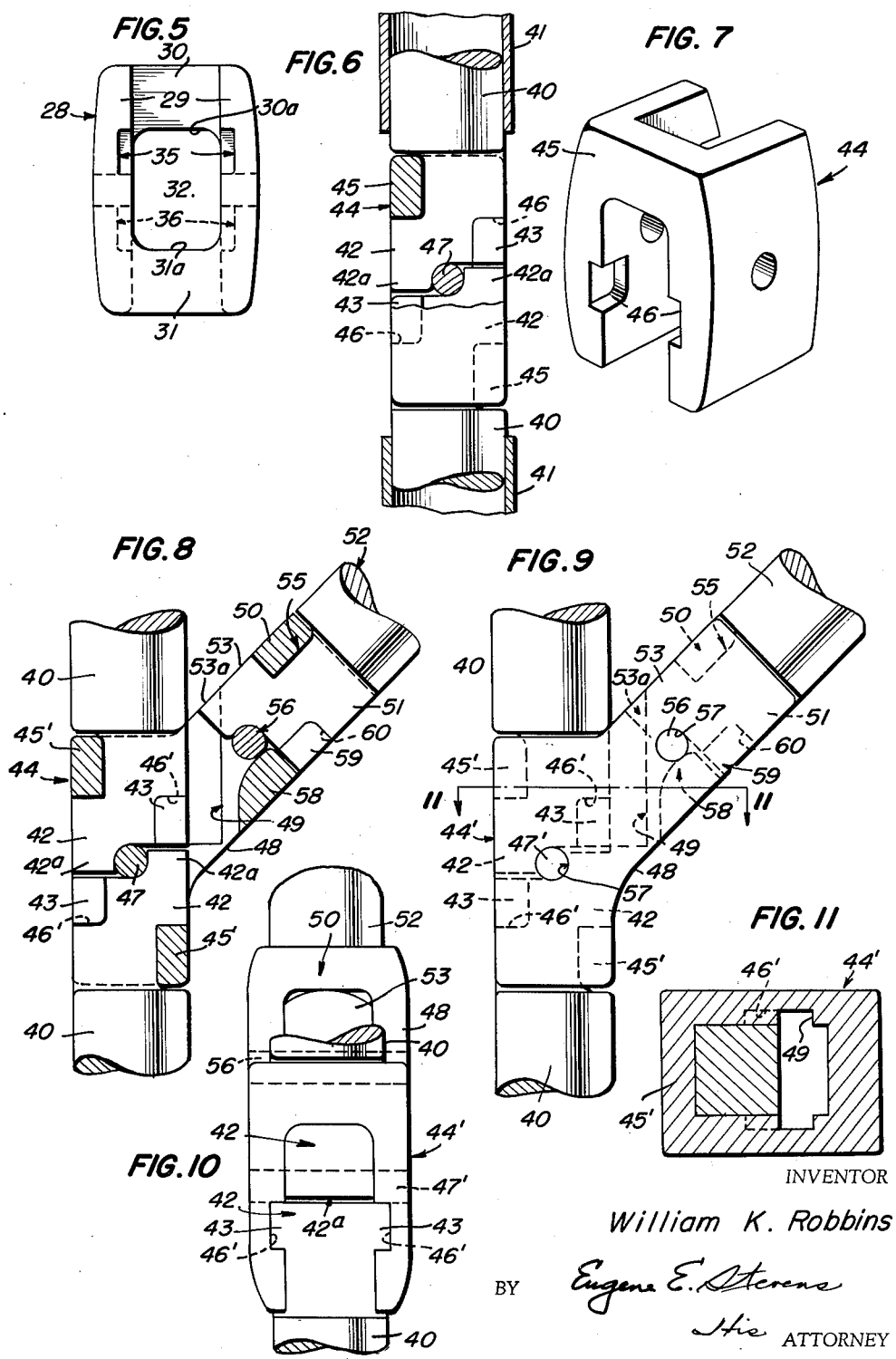

3,031,219
INTERLOCKED JOINT HAVING REMOVABLE
ABUTMENT IN LATERAL COMPRESSION
William K. Robbins, Milwaukee, Wis.
(13453 Moorpark St., Sherman Oaks, Calif.)
Filed June 15, 1954, Ser. No. 436,851
11 Claims. (Cl. 287—103)

My invention relates to a multi-purpose separable connecting means which may be incorporated in separable section repair links for chains, in struts, braces and other structural members employed, for instance, in knockdown scaffolding, portable type bridges, roofing support, and for many other purposes.

The instant invention is an improvement over the separable connection which is disclosed in my Patent No. 2,621,470, dated December 16, 1952, for "Connecting Link for Chains and the Like," and it has for its primary object to provide a separable connecting means which can be readily and inexpensively embodied in chain repair links, and other separable section structures which are produced by a simple forging operation, and without requiring employment of the so-called "upset" type of forging equipment.

More specifically, the present invention contemplates connecting means, as characterized, wherein all the cooperating portions are initially forged in position for use without requiring the use of the upset type of forging equipment or subsequent bending operations such as are necessary in the formation of the stud-receiving socket portions of my above referred to patent.

It is also an object of the invention to provide connecting means of the class indicated which may be welded or otherwise secured to tubular and other members for the connection of same; and which may further be employed in connecting of angularly related members.

Various other objects and advantages of the invention will be understood and appreciated by those versed in the art upon reference to the accompanying drawings in connection with the detailed description thereof to follow.

Although I have illustrated in the drawings several embodiments of my inventive concept, it is to be understood that the invention is susceptible of many other mechanical expressions within the spirit and scope of the subject matter claimed hereinafter.

In the drawings, wherein the same reference characters have been used to designate the same parts throughout the several views—

FIG. 1 is an elevational view partly broken and partly in section showing a chain repair link or the like embodying the invention;

FIG. 2 is a side elevation of the link which is shown in FIG. 1;

FIG. 3 is a perspective view of one of the link sections illustrated in FIGS. 1 and 2;

FIG. 4 is a side elevational view of a socket-form connector which is incorporated in the invention;

FIG. 5 is an edge view of the socket-form connector of FIG. 4 looking at the latter from the right;

FIG. 6 is a view partly broken and partly in section illustrating the invention as a rod connector;

FIG. 7 is a perspective view of the socket member of FIG. 6;

FIG. 8 is a view similar to FIG. 6 of a further modification;

FIG. 9 is an elevation of the socket member of FIG. 8;

FIG. 10 is an edge elevation of FIG. 9; and

FIG. 11 is a sectional view taken on the line 11—11 of FIG. 9.

Referring to the drawings by reference characters, and turning first to FIGS. 1 and 2, numeral 10 designates each of the two duplicate link sections, or halves, which are adapted to be separably connected by the duplicate socket-providing members 28, one of which is illustrated in FIG. 4.

As shown in FIGS. 1 and 2, and likewise in FIG. 3, each of the link sections 10 has two stud-providing limbs or terminal portions which are indicated at 11, 12, respectively. Opposite sides of the limb terminals 11, 12 are flattened to provide the parallel sides 13 as indicated in FIGS. 2 and 3.

The limb or terminal 11 is cut away at its inner side to provide the recess or seat 14 and to define the inwardly projecting stud 18 having the shoulder 16, which latter provides one wall of recess or seat 14.

The other limb or terminal 12 of each link section 10 has the recess 15 in its outer surface and which is aligned with the recess 14 of the terminal 11. Recess 15 defines the outwardly projecting stud 19 which is aligned with the stud 18 and the stud 19, as shown, provides the shoulder 17 which defines one wall of recess 15.

The respective studs 18, 19 have the nose portions 24, 25, respectively, which extend in the direction of the axis of the related limb 11 or 12. The respective nose portions 24, 25 of the studs extend beyond the plane of the related end 20 (or 21) of the limbs 11, 12, as shown.

The projecting nose portions 24, 25 of studs 18, 19 provide shoulders 22, 23, respectively, which define the rightmost boundary of the limb end surfaces 20, 21, as indicated.

Projecting from the outer forward corner at each side of the link limb 11 is a lug 26, while projecting outwardly from each side of the inner corner of the outer end of the limb 12, as shown in FIG. 2, is a lug 27.

From an inspection of FIGS. 1 and 2, it will be apparent that when the duplicate link halves 10 are assembled with the socket-providing connectors of FIGS. 4 and 5, the said link halves 10 are reversed with respect to one another. Thus, FIG. 1 shows the upper link half with its studs 19, 18 directed toward the left as seen in FIG. 1, whereas the studs 18, 19 of the lowermost link section 10 are directed toward the right. In each instance, it will be noted that the outwardly directed studs 19 are outermost. The socket-providing connector which seats the link studs 18, 19 and 18, 19, will now be described.

Referring to FIGS. 4 and 5, it will be seen that each of the duplicate socket-providing connectors 28 comprises the spaced parallel and matching walls 29 which are connected by the two cross bridges 30 and 31. Bridge 30 connects the side walls 29 at one outer corner thereof while the bridge 31 connects said side walls 29 at the diagonally opposite corner of said member.

The bridges 30, 31 with the side walls 29 define the opening 32 shown in FIG. 5, and into which the link limb studs 18, 19 are introduced from opposite edges of said socket member 28, as will be understood from an inspection of FIG. 1.

Also, the side walls 29 and the connecting bridges 30, 31 provide the seats 33, 34, respectively, for the limb portions 12 or 11, of the link sections 10, as indicated in FIGS. 4 and 5, considered with FIGS. 1 and 2.

When the link sections 10 and the socket-providing connectors 28 are assembled as in FIG. 1, it will be noted that the stud shoulder 17 of the upper link section is positioned to seat against the shoulder 30a provided by the innermost side edge of the bridge 30; and that the shoulder 16 of the limb stud 18 of said upper section 10 engages the shoulder 30a provided by the bridge 30 of the companion socket-providing connector 28. The stud-provided shoulders 16, 17 of the other link section 10, the lowermost one as viewed in FIG. 1, engage the shoulder-providing inner edges 31a of the bridges 31.

It should be noted here that each of the socket-providing connectors 28 has its walls 29 provided with registering outer edge recesses to receive the lugs 26 or 27 which are carried by the respective link studs 18, 19, the interfitting of these parts being illustrated in FIGS. 1 and 2.

More specifically considered, it will be noted that FIG. 4 shows the lug-receiving recess 36 of the member 28 as opening from the edge 29 thereof, while the lug-receiving recess 35 opens from the opposite edge 29b of same. The stud lugs 26, 27 make a snug sliding fit in the related recesses 35 or 36 so that the end walls 35a, 36a of the said recesses cooperate with the adjacent lug portion to help sustain the load which the assembled link 10, 10 is subjected to in service.

It might here be observed that the lugs 26, 27 and recesses 35, 36 may be dispensed with in instances where the link or other assembly is not to be subjected to heavy loads.

The link sections are held assembled by means of a pin 38 which is projected through the hole 37 in the opposite side walls 29 of each socket-providing connector 28, said pin projecting through the space between the shoulders 22, 23 of the respective studs 18, 19 so as to prevent the link sections 10 from being separated by relative lateral movement. The pin 38 makes snug engagement with the said shoulders 22, 23 as indicated in FIG. 1.

It is a simple matter to separate the sections 10 after pins 38 have been removed, because then the upper link section 10, for instance, can be moved to the right as seen in FIG. 1 sufficiently to clear the outer end of stud 19 from the inner surface of bridge 30 and the outer end of stud 18 from the inner surface of the bridge 30 of the companion socket member. Then the parts can be simply lifted out endwise as will be apparent.

The modified form of invention illustrated in FIG. 6 deals with the connection of a strut, brace or the like, wherein the rods 40 being connected may be simply stub sections welded to project from the ends of tubular members 41. In carrying out this phase of the invention, the arrangement of interlocking parts is identical with that shown, for instance, at the left of FIG. 1. Thus, each rod section 40 terminates in a laterally projecting stud 42 having the nose portion 42a and the lugs 43 projecting from opposite sides of the rear corners of said studs 42.

As shown in FIG. 6, the studs 42 project in opposite directions and hook against inner shoulders provided by the respective bridges 45 which connect opposite side walls of the socket-providing member or connector 44 at diagonally opposite corners of the latter. The opposite walls of the socket-providing connector 44 provide seating recesses 46 for the lugs 43, which is the same arrangement shown in FIGS. 1 and 2. The socket-providing connector 44 carries the pin 47 which is projectable between the nose portions 42a of studs 42 to prevent movement of the latter in directions which would enable them to be disengaged from the related bridge member 45.

A further form of the invention is illustrated in FIG. 8, wherein diagonally arranged strut elements or the like are connected. Thus, the socket-providing connector 44' has the branch 48 for effecting connection of a diagonally arranged strut or the like 52. The connector 44' effects connection of said members 40, the same as in FIG. 6, the parts 45' 46', 47' corresponding to the parts 45, 46, 47 of FIG. 6.

However, the socket-providing connector 44' has the diagonally extending branch 48 which provides the clearance area 49 which admits of outward movement of the stud end 42 of the upper rod section 40 as indicated in FIG. 9.

The outer end of the socket branch 48 has the bridge 50 connecting the side walls thereof but instead of a second bridge diagonally opposite the bridge 50 there is provided the inwardly projecting abutment 58 which connects side walls of the branch socket portion 48. The stud end 53 of the diagonal rod or brace member 52 hooks against the shoulder provided by the inner edge of the bridge 50 and the nose portion 53a of stud 53 is arranged in spaced opposition to the abutment 58. Thus, when the retaining pin 56 is inserted through aligned holes 57 in opposite sides of the branch 49, such pin 56 will brace against 58, 53a to hold the stud-carrying end 51 of rod 52 in the position shown.

The stud end 51 of the rod 52 may have a lug 59 projecting from opposite rear corners thereof to engage in recesses 69 provided by the opposite walls of the branch portion 48 of the socket 44'. This also is in accordance with the disclosures of FIG. 6 and FIG. 1 in reference to studs there illustrated.

From the foregoing description read in connection with the accompanying drawings, it will be apparent that the various parts can each be initially forged "in position," so as to speak, without necessitating the "upsetting" forging operation necessary in the formation of the socket portions of the link halves disclosed in my Patent No. 2,621,470, aforementioned. It is also important to note that no confining or retaining wall is necessary in the socket members such as 28 of FIGS. 1–5, inclusive, opposite the nose portions such as 24, 25 of FIG. 1 as is required in my patent mentioned, the pins 38 obviating the necessity for same. It is also pertinent to remark that the pins 38 etc. may be so-called groove type pins which are self-retaining and can be driven into place. Such pins as 38 of FIGS. 1 and 2, and the analogous pins of the other views sustain no load whatever when the associated structures are in service and merely retain the related shank portions in assembly with the socket members such as 28.

If desired, the socket members such as, for instance, 28 can be welded, or otherwise secured, to one shank terminal so as to, in effect, provide a functionally integral unit therewith.

Also, the device or invention as expressed in FIGS. 6 and 7 lends itself to ready use in connecting tubular members, the shank portions 40 being welded to the tubular members 41.

An important point is to be emphasized in connection with the invention as applied to link halves 10, as in FIGS. 1 and 2, when the assembled link 10, 28, 10, 28 is subjected to a longitudinal load in service. When this happens, there is a tendency for the outermost studs 19 to be compressed inwardly and for the innermost stud ends 18 to be compressed outwardly, especially if the lugs 26, 27 and related connector seats 35, 36 are eliminated. This tendency is caused by the application of such longitudinal load to the interengaging shoulders 17, 31a and 16, 30a, as will be understood from an inspection of FIG. 1. But as will also be appreciated, the two forces counteract one another through the intervening pin 38 which is in "compression," so as to speak.

Having thus described my invention what I claim is:

1. A separable connection for at least two-member terminals and comprising a socket-providing connector open at each end and providing spaced side walls, a laterally projecting stud at the outer end of each terminal member and providing a load-sustaining shoulder at one side, said studs extending in opposite directions, each stud having a laterally extending nose portion at the side which is remote from said shoulder and extending beyond the plane of the free end of the related member terminal and as an offset extension of the latter, load-sustaining bridge portions connecting the side walls of said socket-providing member adjacent diagonally opposite corners of the latter, said bridge portions and the side walls of said connector cooperating to provide communicating outwardly facing stud-receiving sockets opening directly from opposite sides of said connector and into which said respective studs and adjacent terminal portions are moved transversely of the axis of the connector, the bridge portions being located adjacent the inner ends of the respective connector-provided sockets and engaged by the load-supporting shoulder of the related stud in its socket-seated position, the stud-provided nose portions and terminal member ends being in spaced opposition to one another with the nose portions disposed at opposite sides of the longitudinal axis of said connector when the stud-shoulders are in load-sustaining engagement with said bridge portions, and a removable connector-carried abutment interposed between the nose portions and terminal ends to prevent movement of the stud shoulders out of load-sustaining relationship with said bridge portions, said abutment being under compression from said stud nose portions from opposite sides when the connection is under load whereby to resist bridge-induced tendency to bend the studs and whereby to prevent relative movement of the terminals in a releasing direction.

2. A separable connection for at least two member terminals and comprising a socket-providing connector open at each end and providing spaced side walls, a laterally projecting stud at the outer end of each terminal member and providing a load-sustaining shoulder at one side, said studs extending in opposite directions, each stud having a laterally extending nose portion at the side which is remote from said shoulder and extending beyond the plane of the free end of the related member terminal and as an offset extension of the latter, load-sustaining bridge portions connecting the side walls of said socket-providing member adjacent diagonally opposite corners of the latter, said bridge portions and the side walls of said connector cooperating to provide communicating outwardly facing stud-receiving sockets opening directly from opposite sides of said connector and into which said respective studs and adjacent terminal portions are moved transversely of the axis of the connector, the bridge portions being located adjacent the inner ends of the respective connector-provided sockets and engaged by the load-supporting shoulder of the related stud in its socket-seated position, the stud-provided nose portions being in spaced opposition to one another at opposite sides of the longitudinal axis of said connector when the stud shoulders are in operative relationship with said bridge portions, and a removable connector-carried abutment interposed between said nose portions, said abutment being under compression from said stud nose portions from opposite sides when the connection is under load whereby to resist bridge-induced tendency to bend the studs and whereby to prevent relative movement of the terminals in a releasing direction.

3. A shank connection or the like comprising a pair of shank terminals, a connector member providing a pair of outwardly facing shank terminal-receiving seats opening directly from opposite sides and ends of said member, said terminals being movable transversely of the longitudinal axis of said member to engagement in said seats and the latter being substantially aligned and communicating with one another in the direction of the length of said member, transversely interengaging load-supporting shoulders provided by each of said related shanks and seats short of the opposed inner ends of said shanks, the load-supporting shoulders of the shanks extending inwardly from opposite sides of the latter, said seat-provided shoulders located adjacent diagonally opposite side portions of said connector member and in transverse planes spaced lengthwise of said member a distance greater than the additive distance from each shank shoulder to the adjacent end of the related shank terminal, whereby adjacent shank terminal ends will be spaced from one another when the related shank and connector member shoulders are in engagement, an axially projecting nose portion of less than shank thickness and extending from the seated end of each shank terminal at the shoulder-providing side thereof, said nose portions being laterally spaced from one another on opposite sides of the longitudinal axis of the connector, and connector member-carried means interposed between and against said opposed shank terminal ends and nose portions whereby to hold the related shank and member shoulders in engagement and to absorb compression load therefrom and to retain said shank terminals against transverse unseating outward movement with respect to said connector member.

4. A shank connection or the like comprising a pair of shank terminals, a connector member providing a pair of outwardly facing shank terminal-receiving seats opening directly from opposite sides and ends of said member, said terminals being movable transversely of the longitudinal axis of said member to engagement in said seats and the latter being substantially aligned and communicating with one another in the direction of the length of said member, transversely interengaging load-supporting shoulders provided by each of said related shanks and seats short of the opposed inner ends of said shanks, the load-supporting shoulders of the shanks extending inwardly from opposite sides of the latter, said seat-provided shoulders located adjacent diagonally opposite side portions of said connector member, an axially projecting nose portion of less than shank thickness extending from the seated end of each shank terminal at the shoulder-providing side thereof, the seated shank terminal ends and nose portions being in spaced opposition to one another when the related load-supporting shoulders are in engagement, and connector member-carried means interposed between said opposed shank terminal ends and nose portions whereby to hold the related shank and member shoulders in engagement and to absorb compression load therefrom and to retain said shank terminals against transverse unseating outward movement with respect to said connector member.

5. A separable section loop form member such as a repair link for chains and providing duplicate substantially U-form sections, each section providing shank terminal portions, a stud projecting in the same direction laterally from each shank terminal adjacent the free end thereof, a connector member for the shank terminals at each side of said loop form member, each connector member providing a pair of shank terminal and stud receiving seats opening from opposite sides and ends thereof, said seats of each connector member being substantially aligned and communicating with one another in the direction of the length of said member, transversely inter-engaging load-supporting shoulders provided by each of said studs and seats short of the opposed inner ends of said shanks, said duplicate sections being moved inwardly from opposite directions to assembled relationship with said connector members, the seat-provided shoulders of each connector member located adjacent diagonally opposite side portions thereof, an axially projecting stud-provided nose portion of less than shank thickness extending beyond the seated end of each shank terminal, the seated shank terminal ends and nose portions being in spaced opposition to one another when the related load-supporting shoulders are in engagement, means carried by each connector member and interposed between said opposed shank terminal ends and nose portions whereby to hold the related shank and member shoulders in engagement and said shank terminals against transverse unseating outward movement with respect to the related connector member.

6. The combination set forth in claim 1, and said removable connector carried abutment comprising a pin, and the side walls of said connector having seating means for said pin.

7. The combination set forth in claim 2, and said removable connector carried abutment comprising a pin, and the side walls of said connector having seating means for said pin.

8. The combination set forth in claim 4, and a load-supporting lug carried by each shank at the opposite side from that providing its shoulder, said connector member providing a seating recess for each shank lug opening from opposite sides thereof, and each recess having a load-supporting wall engaging the related lug.

9. The combination set forth in claim 4, and said connector member having a laterally extending socket-providing branch projecting from one side, said branch providing a recess opening toward said member side and into which one of said aforementioned shank terminals is movable to clear its shoulder from the related socket member shoulder, said branch socket being open at its outer end and at one side, a third shank terminal engageable in said branch socket from the open side of the latter and projecting as an extension from the open outer end of said branch socket, said branch socket and third shank terminal having interengaging load-supporting shoulders at one side, an axially extending nose portion projecting as an extension from the shoulder-providing side of the socketed inner end of said third shank terminal, and a removable stop member carried by said branch and disposed adjacent the inner end of the third shank terminal and the inner surface of said nose extension therof to retain the parts assembled.

10. The combination set forth in claim 4, and said connector member having a laterally extending socket-providing branch projecting from one side, said branch providing a recess opening toward said member side and into which one of said aforementioned shank terminals is movable to clear its shoulder from the related socket member shoulder, said branch socket being open at its outer end and at one side, a third shank terminal engageable in said branch socket from the open side of the latter and projecting as an extension from the open outer end of said branch socket, said branch socket and third shank terminal having interengaging load-supporting shoulders at one side, an axially extending nose portion projecting as an extension from the shoulder-providing side of the socketed inner end of said third shank terminal, a removable stop member carried by said branch and disposed adjacent the inner end of said third shank terminal, and a fixed stop member-sustaining abutment carried by said branch socket adjacent said stop member at the opposite side of the latter from said nose extension.

11. A separable section loop form member such as a repair link for chains and providing duplicate substantially U-form sections, each section providing shank terminal portions having their free ends lying in the same plane, a stud projecting in the same direction laterally from each shank terminal adjacent the free end thereof, a connector member for the shank terminals at each side of said loop form member, each connector member providing a pair of shank terminal and stud receiving seats opening from opposite sides and ends thereof, said seats of each connector member being substantially aligned and communicating with one another in the direction of the length of said member, transversely interengaging load-supporting shoulders provided by each of said studs and seats short of the opposed inner ends of said shanks, the seat-provided shoulders of each connector member located adjacent diagonally opposite side portions thereof, an axially projecting stud-provided nose portion of less than shank thickness and extending beyond the seated end of each shank terminal, the seated shank terminal ends and nose portions being in spaced opposition to one another when the related load-supporting shoulders are in engagement, means carried by each connector member and interposed between said opposed shank terminal ends and nose portions whereby to hold the related shank and member shoulders in engagement and said shank terminals against transverse unseating outward movement with respect to the related connector member.

References Cited in the file of this patent

UNITED STATES PATENTS

| | | |
|---|---|---|
| 231,974 | Seed | Sept. 7, 1880 |
| 295,559 | Kitson | Mar. 25, 1884 |
| 534,507 | Hoagland | Feb. 19, 1895 |
| 686,829 | McEwen | Nov. 19, 1901 |
| 785,881 | Hill | Mar. 28, 1905 |
| 1,441,990 | Marvin | Jan. 9, 1923 |
| 2,060,548 | Bolling | Nov. 10, 1936 |
| 2,621,470 | Robbins | Dec. 16, 1952 |

FOREIGN PATENTS

| | | |
|---|---|---|
| 409,134 | France | Feb. 10, 1910 |
| 830,448 | Germany | Feb. 4, 1952 |